United States Patent [19]

Okada

[11] Patent Number: 5,040,649

[45] Date of Patent: Aug. 20, 1991

[54] HST TYPE AXLE DRIVING APPARATUS WITH BRAKE AND TRANSMISSION INTERLOCK

[75] Inventor: Hideaki Okada, Takarazuka, Japan

[73] Assignee: Kanzaki Kokyukoki Mfg. Co., Ltd., Amagasaki, Japan

[21] Appl. No.: 608,790

[22] Filed: Jun. 2, 1989

[30] Foreign Application Priority Data

Jun. 3, 1988 [JP] Japan .................. 63-74689[U]
Aug. 10, 1988 [JP] Japan ................. 63-106265[U]
Feb. 23, 1989 [JP] Japan ................... 1-20985[U]

[51] Int. Cl.⁵ .............. F16H 59/02; F16H 63/08; F16H 59/54
[52] U.S. Cl. .................... 192/4 A; 74/483 R
[58] Field of Search .............. 74/480 R, 481, 482, 74/483 R, 720, 733, 477, 687, 526, 527, 473 R, 606 R; 192/4 A, 4 R

[56] References Cited

U.S. PATENT DOCUMENTS

| | | | |
|---|---|---|---|
| 3,131,580 | 5/1964 | Forster | 180/252 |
| 3,196,696 | 7/1965 | Ritter | 74/15.63 |
| 3,511,105 | 5/1970 | Matter | 74/481 |
| 3,528,311 | 9/1970 | Fieber | 74/481 |
| 3,534,825 | 10/1970 | Reffle | 74/720 |
| 3,645,368 | 2/1972 | Blaauw | 74/481 X |
| 4,491,209 | 1/1985 | Bening | 192/4 A |
| 4,784,013 | 11/1988 | Yamaoka et al. | 74/606 R X |
| 4,903,546 | 2/1990 | Quintille | 74/606 R X |
| 4,922,787 | 5/1990 | Fujisaki et al. | 74/606 R X |

FOREIGN PATENT DOCUMENTS

| | | |
|---|---|---|
| 48-25682 | 7/1973 | Japan . |
| 51-7623 | 3/1976 | Japan . |
| 51-46761 | 11/1976 | Japan . |
| 58-20924 | 2/1983 | Japan . |
| 59-216733 | 12/1984 | Japan . |
| 60-1028 | 1/1985 | Japan . |
| 61-261127 | 11/1986 | Japan . |
| 63-3527 | 1/1988 | Japan . |
| 63-159144 | 7/1988 | Japan . |
| 480955 | 5/1953 | United Kingdom . |
| 2032586 | 5/1980 | United Kingdom . |

Primary Examiner—Allan D. Herrmann
Assistant Examiner—Khoi Q. Ta
Attorney, Agent, or Firm—Sterne, Kessler, Goldstein & Fox

[57] ABSTRACT

An HST type axle driving apparatus for driving axles, wherein, when a braking device provided in the apparatus is operated for braking in the state of forwardly or backwardly speed changing, a hydraulic pump or a hydraulic motor at the HST speed change apparatus is subjected to an over-load, so that in order to eliminate the overload, an association mechanism is so constructed that the HST type speed change apparatus changed of the speed forwardly or backwardly is forcibly and reliable kept in the neutral when the braking device is operated. Also, the association mechanism is disposed within a transmission case so as to make the HST type axle driving apparatus compact.

6 Claims, 13 Drawing Sheets

HST TYPE AXLE DRIVING APPARATUS WITH BRAKE AND TRANSMISSION INTERLOCK

FIELD OF THE INVENTION

The present invention relates to an HST (Hydro-Static Transmission) type axle driving apparatus which houses an HST type speed change apparatus in a transmission case for driving the axles, and more particularly to a mechanism for returning a speed change operation unit at the HST type speed change apparatus to the neutral position when a brake pedal is operated.

DESCRIPTION OF THE PRIOR ART

Conventionally, the assembly of a variable displacement hydraulic pump and a fixed displacement hydraulic pump for an HST type speed change apparatus integrally in the transmission case has been well known as disclosed in the U.S. Pat. No. 3,196,696.

In a case where a braking device at the HST type axle driving apparatus exerts the braking action, the return of the HST type speed change apparatus to the neutral has been well known as disclosed in the Japanese Patent Laid-Open Gazette No. Sho. 59-216733.

The providing of a cam groove at an arm to operate a variable swash plate so as to slowly change rotation thereof in the vicinity of the speed change neutral position has been well known as disclosed in the Japanese Utility Model Publication No. Sho. 48-25682 and No. Sho 51-7623.

SUMMARY OF THE INVENTION

In the axle driving apparatus equipped with the HST type speed change apparatus, when a separately attached braking device is operated in the state where the HST type speed change apparatus changes the speed forwardly or backwardly, the HST type speed change apparatus while delivering pressure oil from the variable displacement hydraulic pump to the fixed displacement hydraulic pump is forcibly applied with the braking action, which causes an overload state, thereby creating inconvenience such as the engine stopping, or the variable displacement hydraulic pump or the fixed displacement hydraulic pump, becoming broken.

The present invention is characterized by including an association mechanism which, when the braking device attached to the HST speed change apparatus is operated to apply braking to the axles, forcibly returns to the neutral position the variable swash plate at the variable displacement hydraulic pump of the HST type speed change apparatus before breaking is applied to the axles.

In the present invention, the HST type speed change apparatus is housed in the transmission case, whereby the association mechanism for the braking device and variable swash plate is constructed to be compact when housed in the transmission case.

Other objects and aspects of the invention will become apparent from the following description of embodiments with reference to the drawings.

BRIEF DESCRIPTION OF THE DRAWINGS

FIG. 16 is a perspective view showing the association mechanism of FIG. 14 mounted on the rear surface of the upper half case 1a.

DESCRIPTION OF THE PREFERRED EMBODIMENTS OF THE INVENTION

Figure 1:
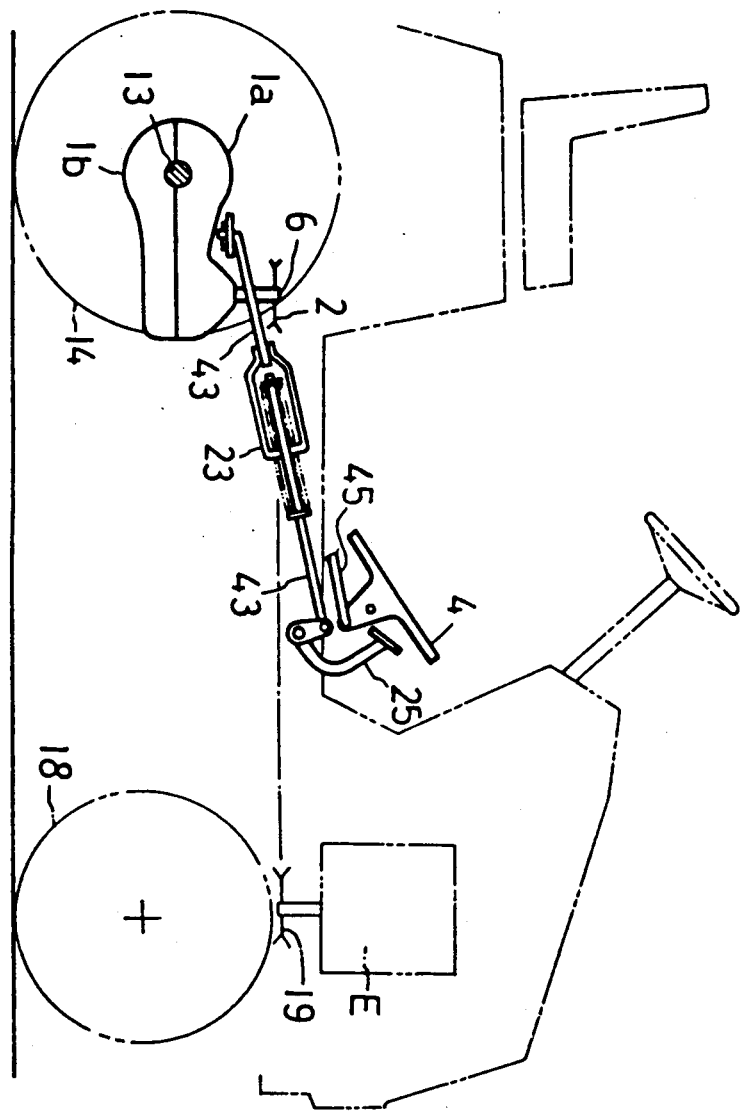
FIG. 1 is a side view of the principal portion of a running vehicle loading thereon an HST type axle driving apparatus of the invention.

Referring to FIG. 1, an HST type axle driving apparatus of the invention attached to a tractor will be described.

An engine E disposed in a bonnet of the tractor is of a vertical crank shaft type, an output pulley 19 is fixed to the lower end of the vertical crank shaft, and a V-belt wound on the output pulley 19 is wound on an input pulley 2 at a pump shaft 6 projecting from a transmission case 1a and 1b.

Axles 13 and other shafts are supported through bearings to the junction surface of the transmission case constituted of an upper half case 1a and a lower half case 16, the axles 13 laterally projecting drive driving wheels 14 respectively, and steering wheels 18 are disposed below the engine E.

A speed change operation unit 4 for changing the speed of the HST type axle driving apparatus housed in the transmission case and for driving the axles 13 is formed as a longitudinal footpedal; and a brake pedal 25 for operating the braking device is juxtaposed with the speed change operation unit 4.

The brake pedal 25 is connected to a brake link 43 through a shock absorber 23.

Figure 2:
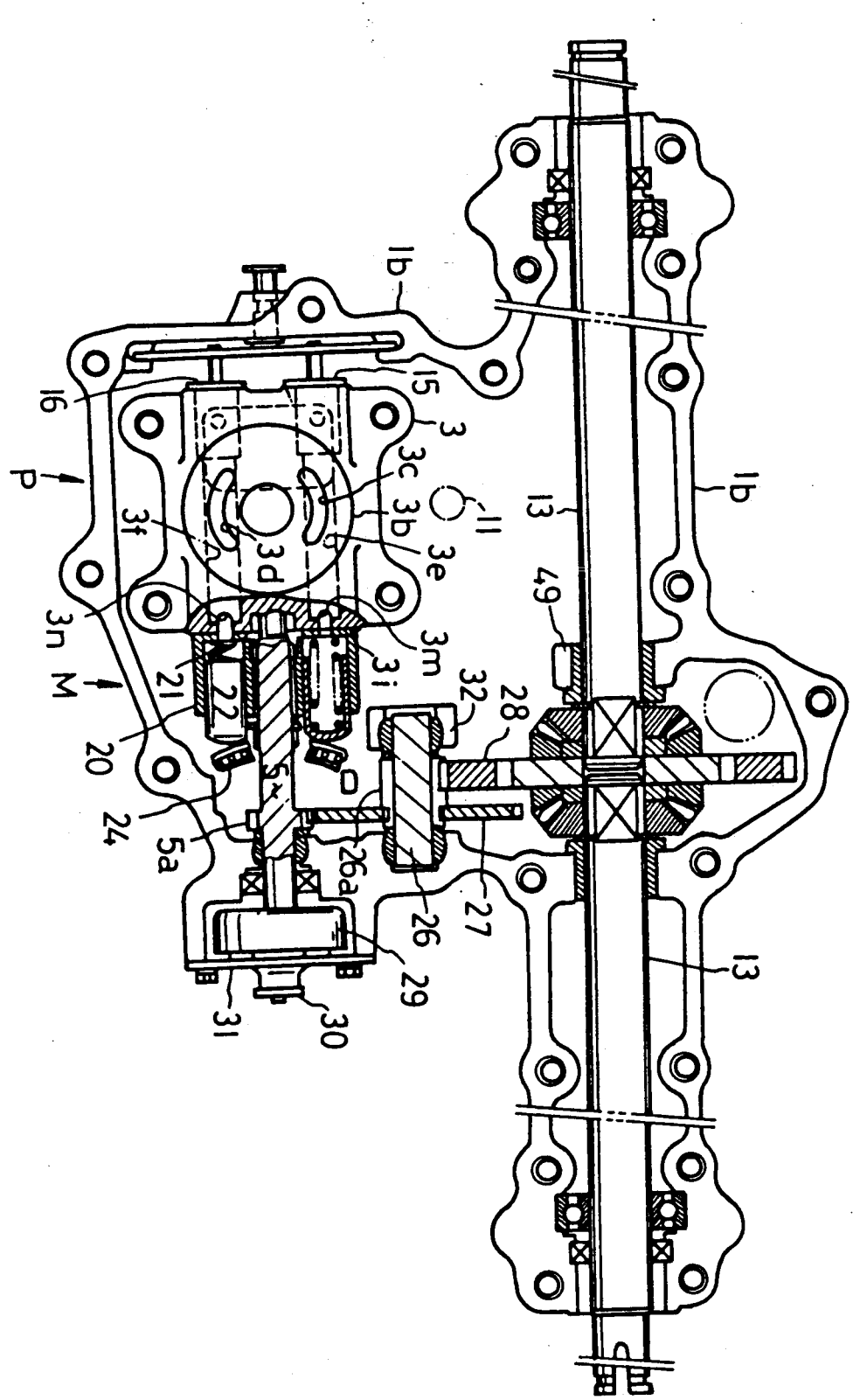
FIG. 2 is a plan view showing the interior of the HST type axle driving apparatus of the invention.
Figure 3:
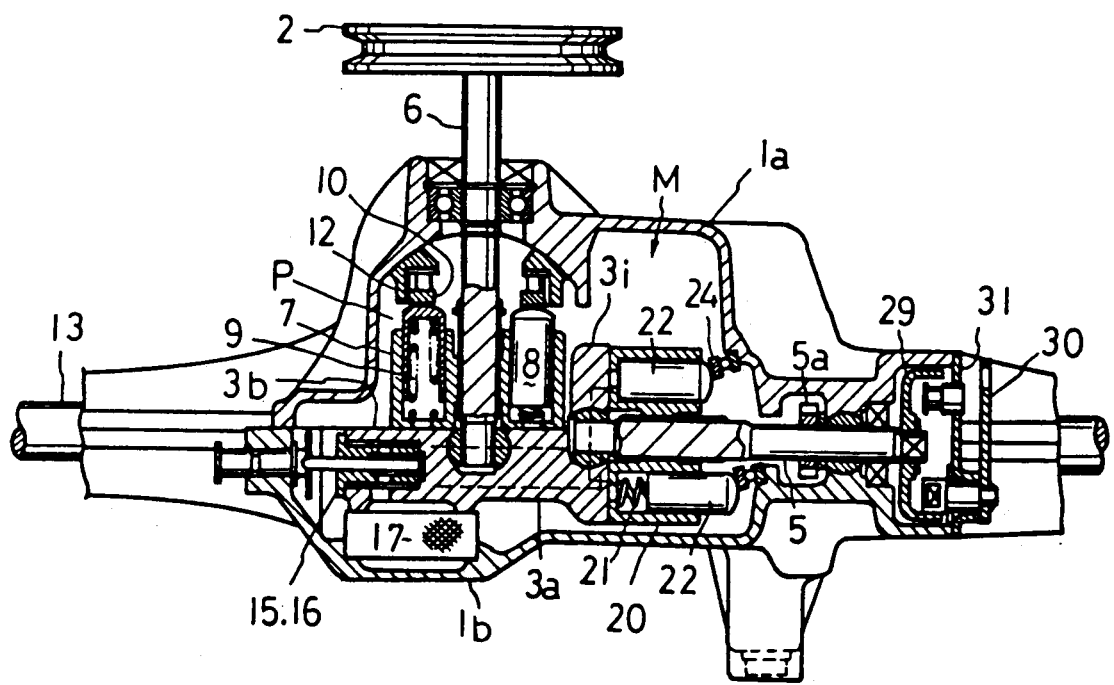
FIG. 3 is a sectional front view of the same.

Referring to FIGS. 2 and 3, explanation will be given generally on construction of the speed change apparatus in the transmission case and the braking device.

The axle driving apparatus that journals axles 13 at the rear portion of the transmission case comprising the upper and lower half cases 1a and 1b, houses the HST type speed change apparatus in the front portion of the same, disposes a braking device at the end of the same, and disposes at the outside or the inside of the upper surface of upper half case 1a an association mechanism for the braking device and speed change apparatus as discussed below.

The HST type speed changing apparatus for changing the number of rotations of the axles 13 is so constructed that an oil passage plate 3 of substantially L-like shape when viewed from front is fixed to the lower surface of uppper half case 1a by bolts, a pump mounting surface 3b is provided at the upper surface of a horizontal plate 3a of the oil passage plate 3, and a variable displacement hydraulic pump is mounted on the pump mounting surface 3b.

Crescent oil passages 3c and 3d are bored at the pump mounting surface 3b, and a pump shaft 6 is erected at the center between the oil passages 3c and 3d and projects upwardly from the upper half case 1a so as to fix an input pulley 2.

A cylinder block 7 (FIG. 3) is fitted onto the pump shaft 6, pistons 8 each biased by a biasing spring 9 are fitted into the cylinder block 7 and disposed around the pump shaft 6, the upper end of each piston 8 abuts against a thrust bearing 10, and the thrust bearing 10 is fixedly fitted onto a variable swash plate 12.

The upper surface in a circular arc of the variable swash plate 12 is slidably guided by the rear surface of the upper half case 1a.

The variable swash plate 12 engages at the outer wall thereof with an arm fixed to a swash plate angle control shaft 11 so that the swash plate angle control shaft 11 is rotated to horizontally rotate the arm, whereby the upper surface in circular arc slidably moves to change inclination of variable swash plate 12 so as to change a discharge amount of operating oil. Hence, a fixed displacement hydraulic motor M is made variable of the rotation speed.

Also, a motor mounting surface 3i is formed at the outer surface of a vertical plate 3j at the oil passage plate 3 and the fixed displacement hydraulic motor M is attached to the motor mounting surface 3i.

In other words, crescent oil passages 3m and 3n are bored at the motor mounting surface 3i, which communicate with the crescent oil passages 3c and 3d through horizontal oil passages 3e and 3f provided in parallel to the horizontal plate 3a respectively.

A motor shaft 5 projects from the center of the motor mounting surface 3i in parallel to the axles 13, a cylinder block 20 is fitted onto the motor shaft 5, each piston 22 biased by a biased spring 21 is fitted into the piston 22, and a fixed thrust bearing 24 abuts against the utmost end of each piston 22.

Accordingly, when the pump shaft 6 together with the cylinder block 7 is rotated, for example, pressure oil generated at the crescent oil passage 3c passes the horizontal oil passage 3e and is guided to the crescent oil passage 3m and then drives the motor shaft 5 together with the cylinder block 20. Thereafter, the pressure oil is discharged from the crescent oil passage 3n, passes the horizontal oil passage 3f, and is taken in the cylinder block 7 from the crescent oil passage 3d.

The other ends of the horizontal oil passages 3e and 3f are closed by check valves 15 and 16 respectively. The check valves 15 and 16 are operated from the exterior to allow the horizontal oil passages 3e and 3f to communicate with the tank so as to make rotatable the fixed displacement hydraulic motor M. An oil filter 17 is disposed below the check valves 15 and 16 so that lubricating oil in the transmission case 1 is supplied as operating oil to the HST type speed change apparatus by opening the check valves 15 and 16.

An output gear 5a is provided on the motor shaft 5 and engages with a large diameter gear 27 on a counter gear 26 and a toothed gear 26a on the counter shaft 26 engages with a differential ring gear 28, so that a driving force from the motor shaft 5 is transmitted to the axles 13 through a differential gear unit.

A brake drum 29 is fixed to the utmost end of the motor shaft 5 and a brake lever 30 pivoted to a lid 31 fixed to the side surface of the transmission case 1 is turned, whereby brake shoes in the brake drum 29 are expanded to exert the braking action.

Next, explanation will be given on a first embodiment of the invention shown in FIGS. 4 through 8.

The brake lever 30 is pivotally connected with a brake link 33, the other end thereof is pivotally connected to one end of a bell crank 34, which is pivotally supported at an intermediate portion to a pivot shaft 36 projecting from the transmission case 1, and the other end of bell crank 34 is pivotally connected with a shock absorber 35.

The shock absorber 35 is provided in order that, when a treading force for the brake pedal 25 exceeds a specified value, a spring at the shock absorber 35 operates not to transmit such excessive force to the brake lever 30.

A slide rod 35a (FIG. 6) in the shock absorber 35, one end of which is connected to the bell crank 34, is inserted at the other end into a cylinder 35c, in which a spring 35b is fitted onto the slide rod 35a and biased in the compressing direction.

A cylinder rod 35d, which is fixed at one end to the cylinder 35c, is pivoted at the other end to the utmost end of a brake arm 37, and a rotary base thereof is pivoted to a rotary shaft 40 fixed to a mounting plate 39 fixed onto the transmission case.

Figure 6:
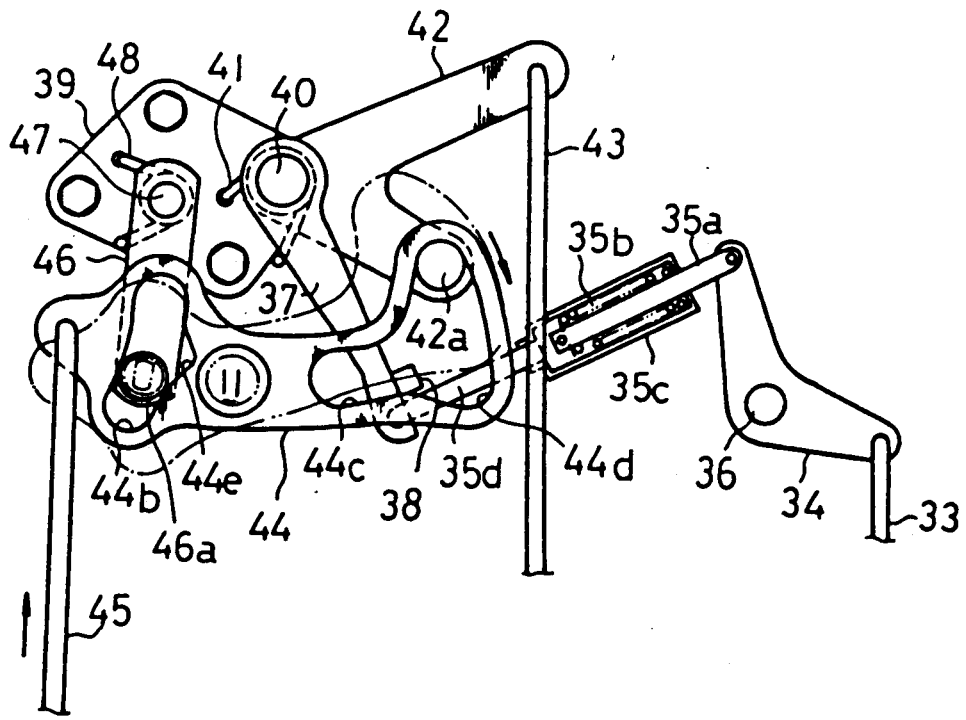
FIG. 6 is a plan view of the association mechanism in the state where the speed change cam plate 44 is rotated to rotate a swash plate angle control shaft 11.

The brake arm 37 is biased toward the shock absorber 35 by a torsion spring 41 fitted onto the rotary shaft 40 and usually retained by a stopper 38 projecting from the transmission case. A distance between the brake arm 37 abutting against the stopper 38 and a regulator 42a biased by the torsion spring 41 and positioned at the depth of a rotary groove 44d during the speed change as shown in FIG. 6 is an allowance gap of the invention, through which the regulator 42a returns a speed change cam plate 44 to the neutral position in a time period when the regulator 42a moves from the position in FIG. 6 to abut against the brake arm 37.

Also, a regulator arm 42 which is V-like-shaped, is pivoted at the central portion to the rotary shaft 40, at one utmost end of the regulator arm 42 is pivotally connected a brake link 43 connected with the brake pedal 25, and the regulator 42a projects from the other end of the regulator arm 42 and is inserted into a regulation bore 44a open at one side of the speed change cam plate 44.

The speed change cam plate 44 is fixed at an intermediate portion to the swash plate angle control shaft 11 and provided at one side with the regulation bore 44d, 44c of a substantially T-like shape.

The regulation bore comprises the rotary groove 44d rotatable for the speed change and formed in a circular arc around the swash plate control shaft 11 and a rotary groove 44c for the braking action, into which the regulator 42a can enter when the variable swash plate 12 is in neutral, the grooves 44d and 44c being continuously integral with each other.

At the other end of the speed change cam plate 44 is pivoted a speed change link 45 connected to a speed change operation unit 4 and includes guide bore 44b in a circular arc around the swash plate angle control shaft 11, a neutral recess 44e (FIG. 6) is provided at the center of guide bore 44b, and a neutral position biasing member 46a projecting from one end of an arm 46 is fitted into the guide bore 44b and biased thereby. The arm 46 is pivoted at the other end to a pin 47 projecting from the mounting plate 39 and biased toward the swash plate angle control shaft 11 by a spring 48 fitted onto the pin 47.

Figure 4:
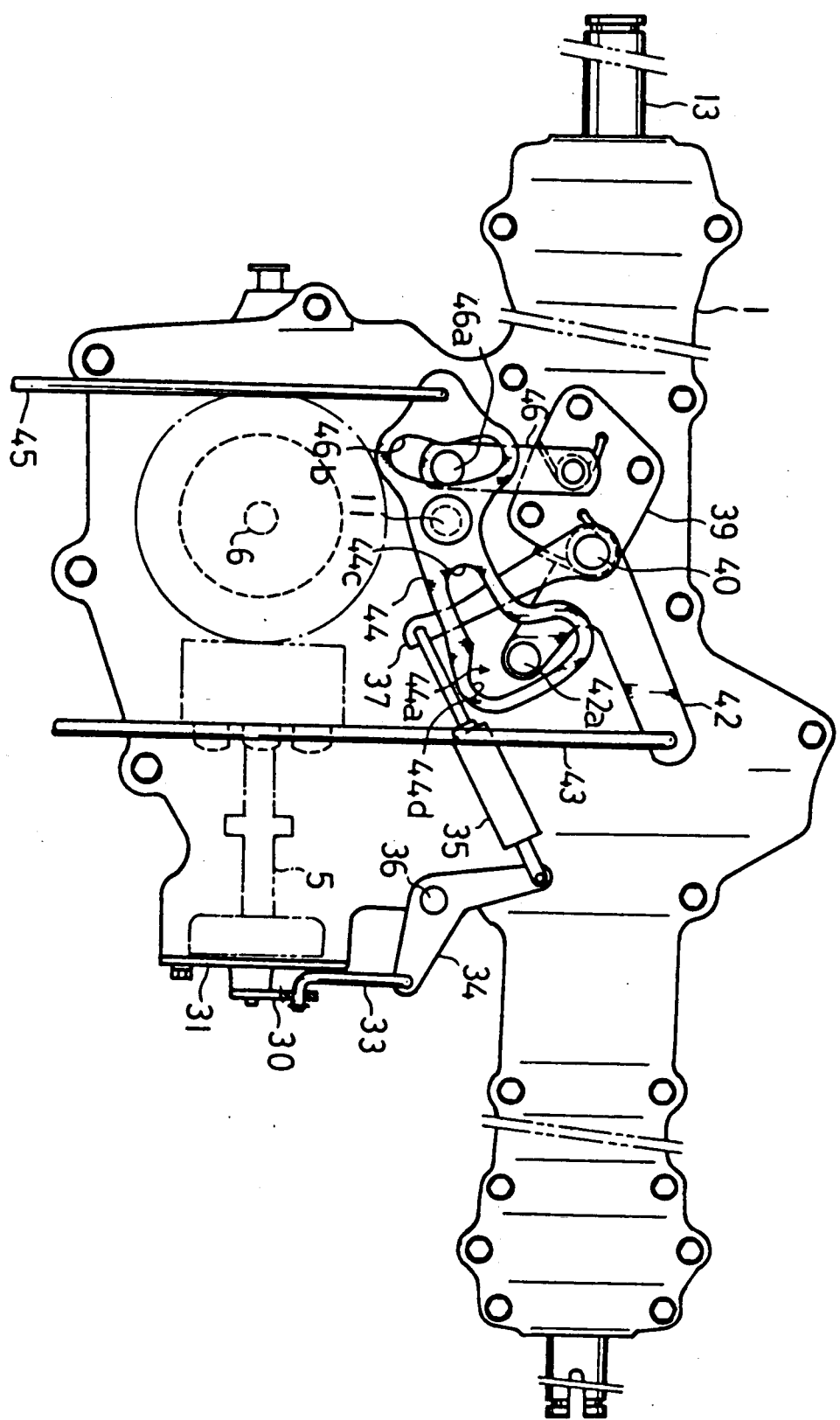
FIG. 4 is a plan view of a first embodiment of the HST type axle driving apparatus of the invention, showing an association mechanism for a braking device provided at the external upper surface of a transmission case and the speed change apparatus.
Figure 5:
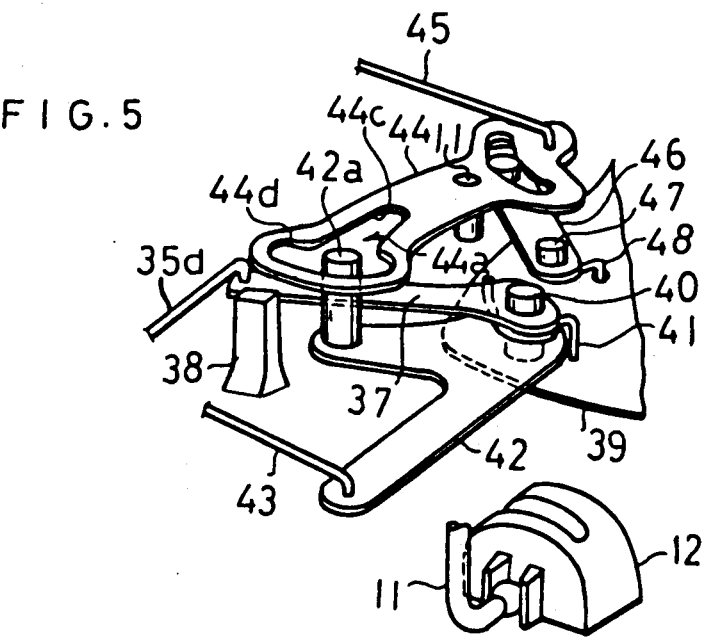
FIG. 5 is a perspective view of a speed change cam plate 44 and a regulation arm 42 at the same.

Accordingly, in the state shown in FIG. 4, the speed change cam plate 44 and variable swash plate 12 are in the neutral positions respectively.

In the aforesaid construction, when the speed change control unit 4 is operated in the state where the brake is not operated, that is, the brake pedal 25 is not trod, as shown in FIG. 6, the speed change link 45 rotates the speed change cam plate 44 in the direction of the arrow, the regulator 42a at the regulation arm 42 is positioned in the rotary groove 44d for the speed changing so as not to regulate the rotation of speed change cam plate 44, and the speed change cam plate 44 is rotated to rotate the swash plate angle control shaft 11, so that an angle of the variable swash plate 12 is changed and a discharge amount from the piston 8 is changed, thereby changing the number of rotations of the hydraulic motor M.

On the other hand, in the neutral position biasing member 46a at the arm 46 riding on the inclined surface of guide bore 44b is biased toward the swash plate angle control shaft 11, thereby being subjected to a force by which the biasing member 46a rotates toward the neutral recess 44e at the guide bore 44b with respect to speed change operation so as to be neutral.

Accordingly, when the speed change control unit 4 is released from operation, the neutral position biasing member 46a reversely rotates the speed change cam plate 44, thereby returning it to the neutral position.

Figure 7:
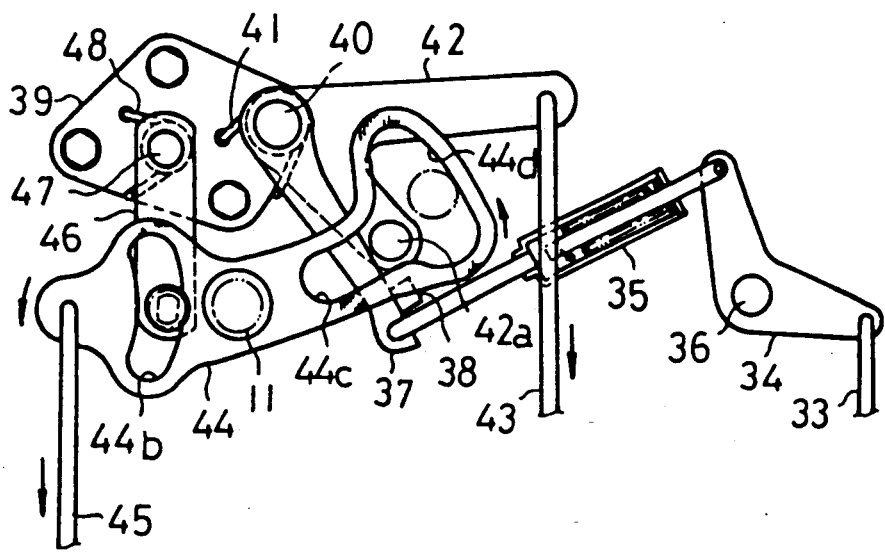
FIG. 7 is a plan view of the association mechanism of FIG. 6 at the initial state where the swash plate angle control shaft 11 is at the neutral position, the braking device starts the braking action, and the regulation arm 42 starts rotation.
Figure 8:
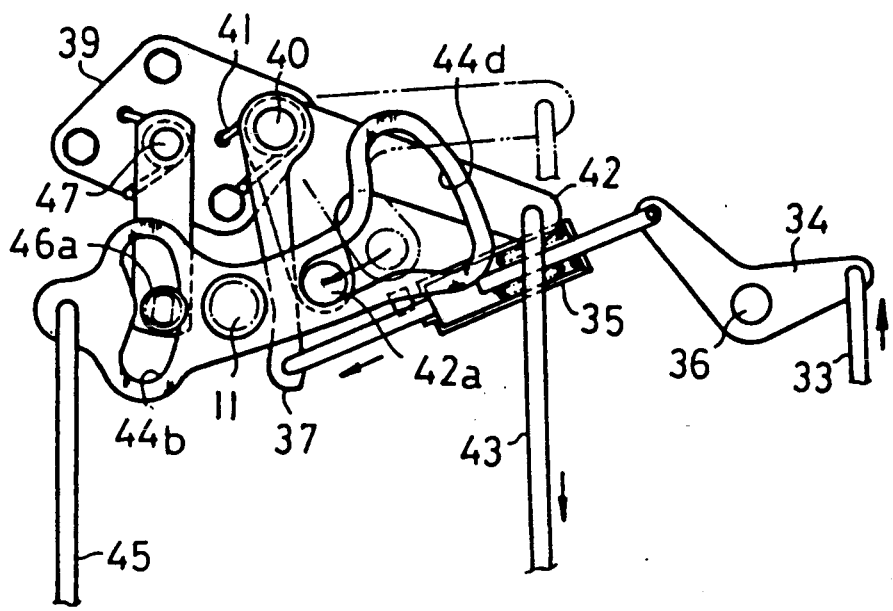
FIG. 8 is a plan view of the association mechanism of FIG. 7 in the state where the regulation arm 42 is rotated to the position where the braking device exerts the braking action.

When the brake pedal 25 is trod in the starting condition, the brake link 43 is pulled and the regulation arm 42 is rotated gradually from the position in FIG. 6, whereby the regulator 42a, as shown in FIG. 7, rotates from the rotary groove 44d for the speed changing to the rotary groove 44c for the braking action, and the speed change cam plate 44 rotates toward the neutral position following the rotation of regulator 42a. Hence, the neutral position biasing member 46a holds the speed change cam plate 44 in position.

Therefore, the variable swash plate 12 is put in the neutral position and the hydraulic pump P generates no oil pressure, thereby cutting off a driving force of the hydraulic motor M.

Then, when the brake pedal 25 is trod, the allowance gap is consumed so that the regulator 42a abuts against the brake arm 37 and rotates to the depth of the rotary groove 44c, and the bell crank 34 rotates to pull the brake link 33 while compressing the spring 35b at the shock absorber 35, thereby turning the brake lever 30 for the braking action.

When an operator removes his foot from the brake pedal 25, a return spring (not shown) reversely rotates the regulation arm 42 through the brake link 43, thereby restoring the regulator 42a to the position shown in FIG. 4.

Next, explanation will be given on construction of a second embodiment of the invention shown in FIGS. 9 through 13.

In this embodiment, the association mechanism for the barke pedal 25 with the speed change unit 4 is housed in the transmission case.

Figure 9:
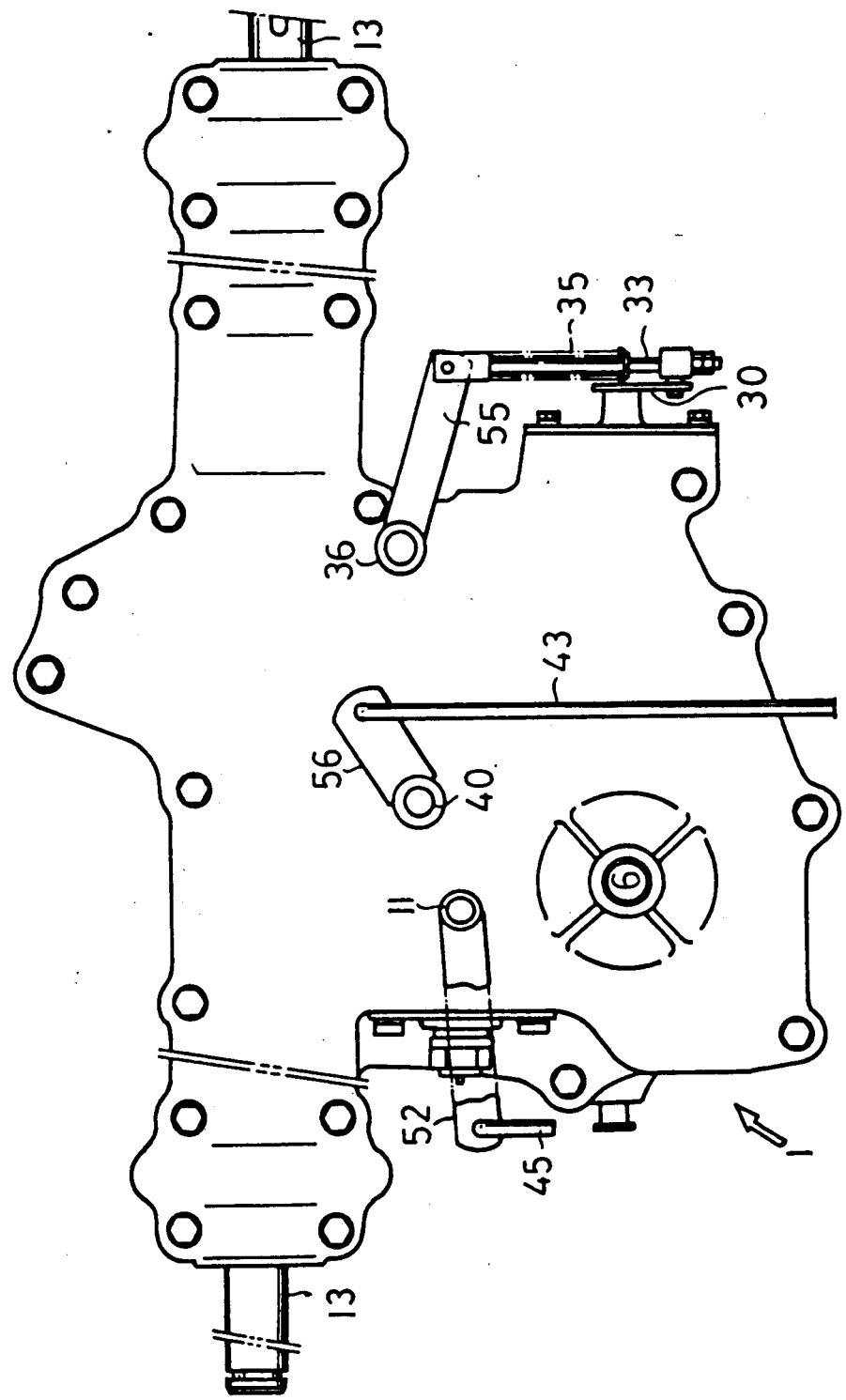
FIG. 9 is a plan view of a second embodiment of the HST type axle driving apparatus of the invention, in which the association mechanism is housed in the transmission case.

As shown in FIG. 9, however, the brake pedal 25 is connected to the upper portion of transmission case 1 through the brake link 43, and the speed change operation unit 4 transmits the operating force to the upper surface of transmission case 1, which is similar to the first embodiment.

The brake link 43 is connected at the utmost end thereof to an arm 56 which is fixed to a regulation arm 51 in the transmission case 1 through the rotary shaft 40.

The utmost end of speed change link 45 is connected to an arm 52 projecting outwardly from the transmission case 1, the arm 52 transmitting the operating force to the variable swash plate within the transmission case 1 through the swash plate angle control shaft 11.

Next, explanation will be given on the state where the upper half case 1a is removed from the transmission case 1 in accordance with the FIGS. 10 and 11 of plan view.

Figure 11:
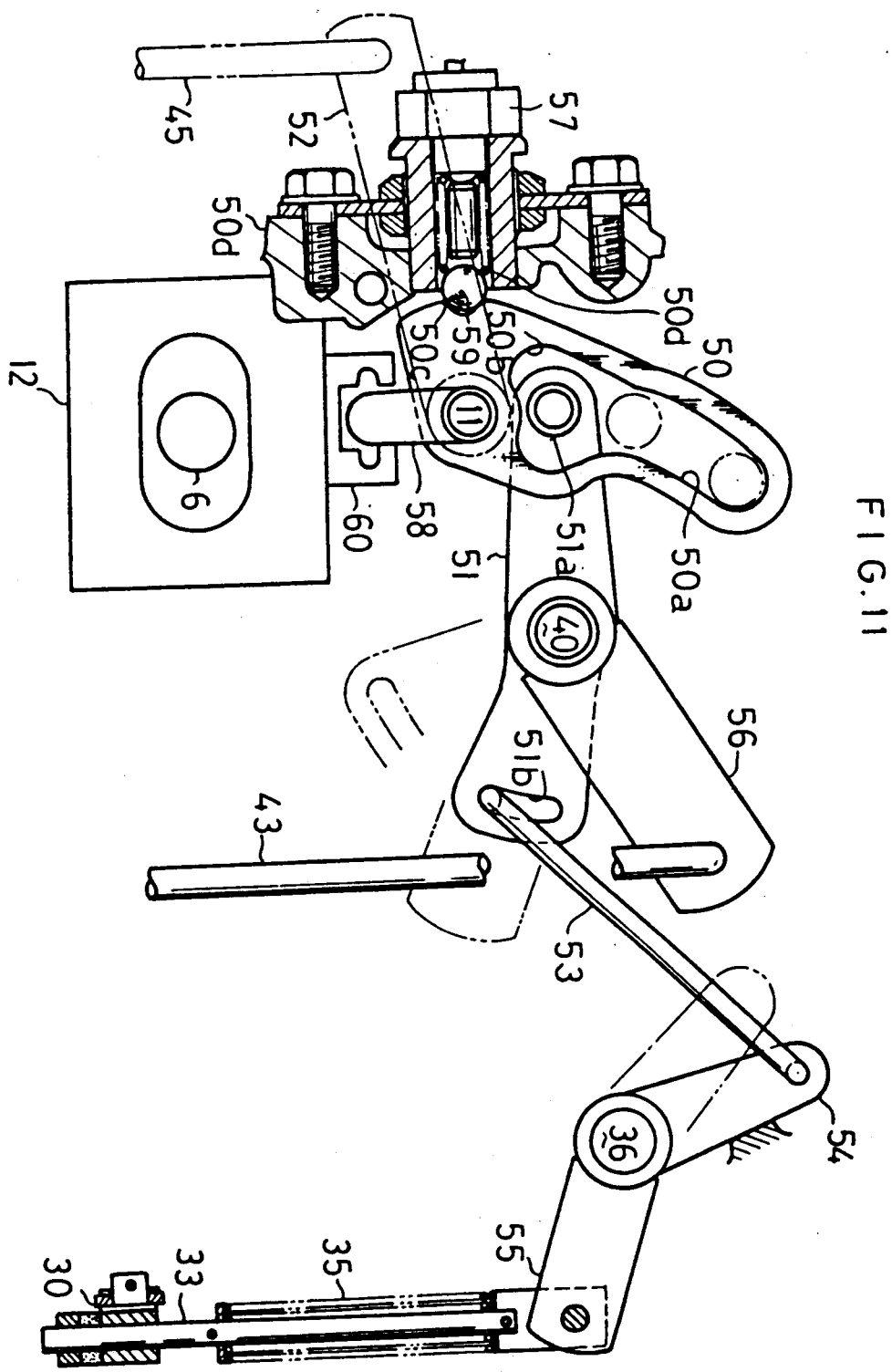
FIG. 11 is a plan view of the association mechanism of the braking device and speed change apparatus of FIG. 10.
Figure 12:
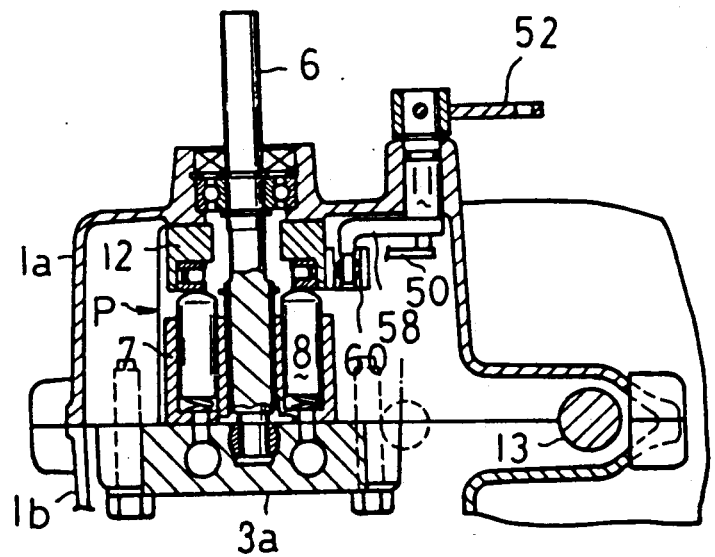
FIG. 12 is a sectional side view showing the relation between a variable swash plate 12 and the swash plate angle control shaft 11 of FIG. 10.

In FIG. 11, the arm 52 is fixed to the swash plate angle control shaft 11, and an arm 58 attached thereto rotates and is fitted at the utmost end into a recess at a variable swash plate engaging member 60 attached to the side surface of the variable swash plate 12.

The swash plate angle control shaft 11 rotates so as to turn the arm 58, whereby the variable swash plate 12 is slid along the circular-arc guide to change an swash plate angle.

A speed change cam plate 50, other than the arm 58, is fixed to the swash plate angle control shaft 11 so as to be simultaneously rotatable.

At the speed change cam plate 50 are bored a rotary groove 50a for the braking action and a rotary groove 50b for the speed changing, and at the outer periphery of the cam plate 50 are provided an insertion recess 50c for a neutral position holding ball 59 and inclined surfaces 50d at both sides of the recess 50c. The neutral position holding ball 59 can adjust by a neutral position holding mechanism 57 from the exterior of transmission case 1 the biasing force given to the speed change cam plate 50.

The rotary groove 50a for the braking action and rotary groove 50b for the speed changing communicate with each other to constitute a T-like-shaped cam groove, in which a regulator 51a at the utmost end of the regulation arm 51 is fitted.

The brake link 43 connected to the brake pedal 25 through the shock absorber 23 is connected at the utmost end to the arm 56 which transmits the operating force into the transmission case 1 through the rotary shaft 40, the regulation arm 51 being fixed to the lower end of the rotary shaft 40.

The regulator 51a is fixed to the utmost end of regulation arm 51 and, as the above-mentioned, is inserted into the cam groove communicating with the rotary groove 50a for the braking action and rotary groove 50b for the speed changing at the speed change cam plate 50.

It is required to provide at the regulation arm 51 an allowance gap for obtaining the allowance through which the speed change cam plate 50 returns to the neutral position without starting the braking action of the braking device at first even when the brake pedal 25 is trod. Hence, in the second and third embodiments, the allowance gap is formed of an allowance elongate slot 51b provided at the regulation arm 51.

Into the allowance elongate slot 51b is inserted one end of a connecting rod 53 and the other end thereof is connected to an arm 54. The arm 54 is fixed to a pivot shaft 36 and an arm 55 is fixed to part of the pivot shaft 36 projecting outwardly from the transmission case 1. A brake link 33 is connected to the utmost end of arm 55 through the shock absorber 35.

In this embodiment, an association mechanism for the braking device and speed change apparatus is disposed within the transmission case 1 and, especially, the association mechanism is disposed at the reverse side to the braking device beyond a power transmission mechanism constituted of the larger diameter gear 27 and differential ring gear 28, whereby it is required to provide a space through which the connecting rod 53 from the association mechanism to the braking device passes.

The connecting rod 53 is pushed or pulled together with operation of brake pedal 25 so as to turn somewhat longitudinally, thereby requiring a sufficient gap.

In the present invention, the connecting rod 53 passes through a space between a counter shaft bearing 32 for supporting a counter shaft 26a at the power transmission mechanism and the axle bearing 49 for supporting the axles 13.

Figure 13:
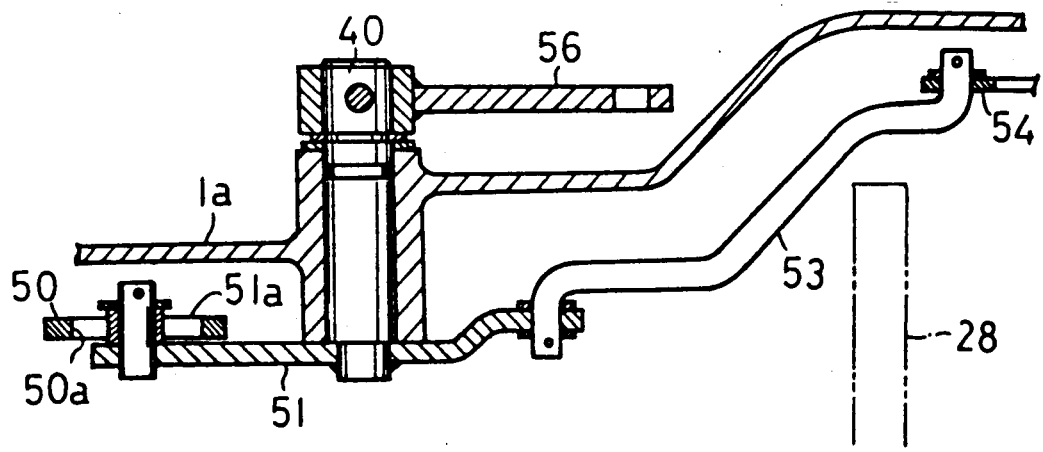
FIG. 13 is a side view showing arrangement of a regulation arm 51 and a connecting rod 53 of FIG. 10.
Figure 15:
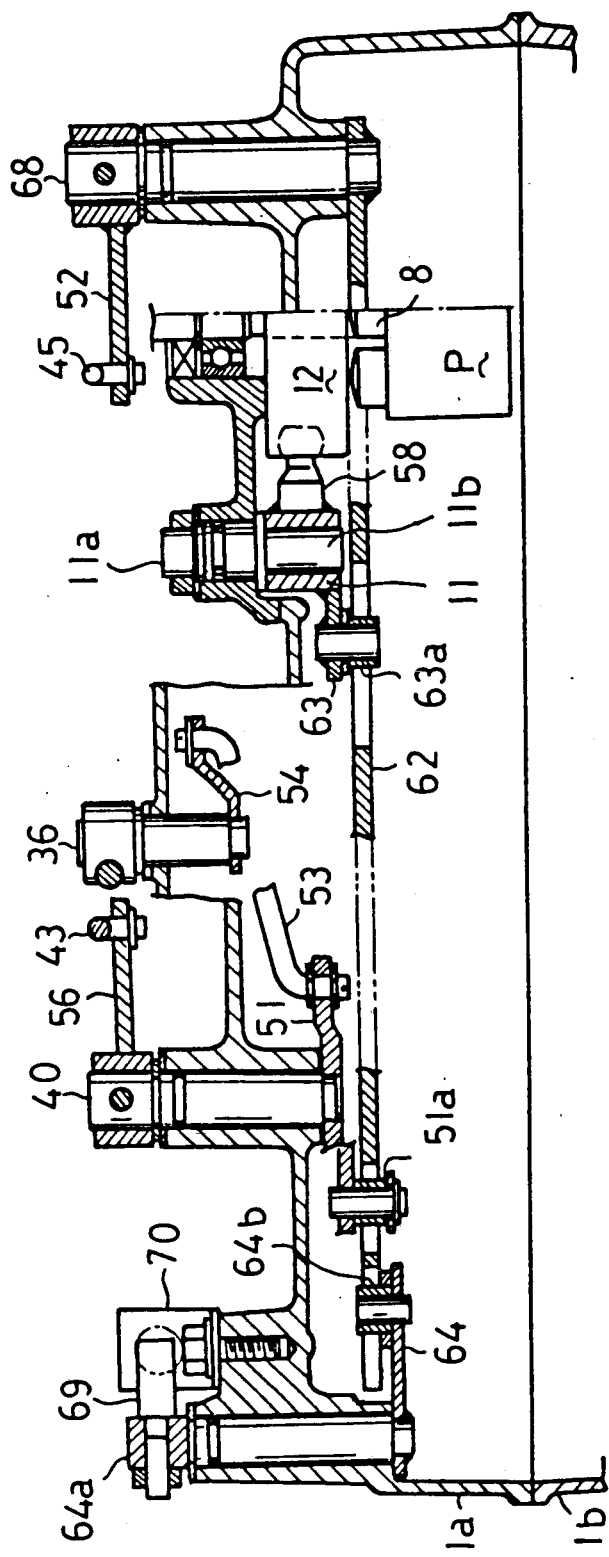
FIG. 15 is a side view of the association mechanism of the same.

Also, as shown in FIG. 13 and FIG. 15 showing a third embodiment of the invention, when the association mechanism for the braking device and speed change apparatus is disposed in the transmission case 1, the mechanism is hung to be supported to shafts projected from the upper half case 1a.

Figure 10:
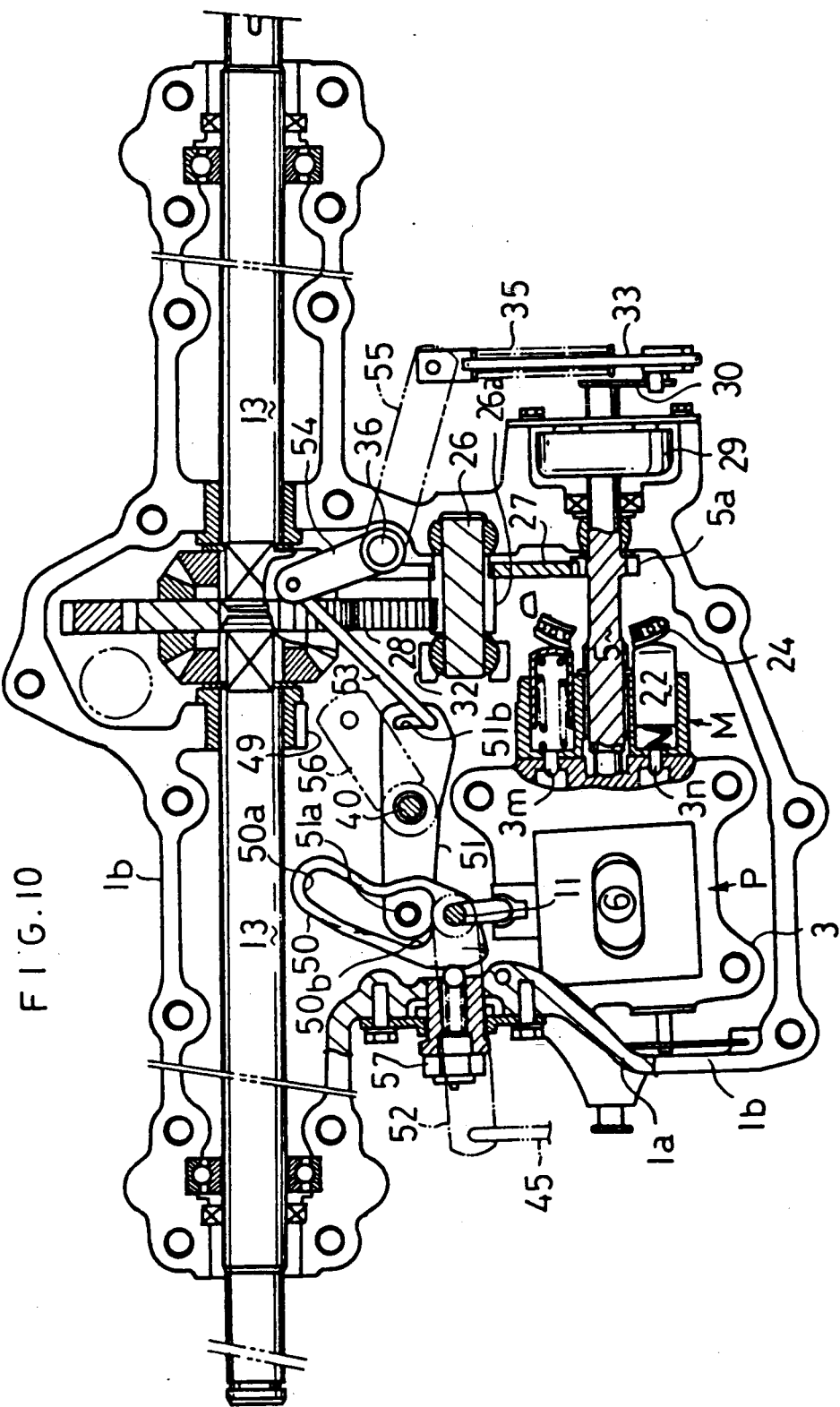
FIG. 10 shows the interior of the transmission case 1 of FIG. 9 in the state where an upper half case 1a is removed.

Accordingly, the state shown in FIG. 10 cannot actually exist, but for the convenience of explanation the association mechanism only is shown upwardly of the lower half case 1b.

In addition, operation of the speed change cam plate 50 by the speed change operation unit 4 and that of the speed change cam plate 5 during the operation of brake pedal 25 are omitted as they are the same in the first embodiment.

The second embodiment is different from the first embodiment in that the neutral holding mechanism and shock absorber 35 are different in position and the association mechanism is disposed in the transmission case 1, but similar to the first embodiment in that, when the brake pedal 25 is operated, the variable swash plate 12 is forcibly returned to the neutral position.

Figure 14:
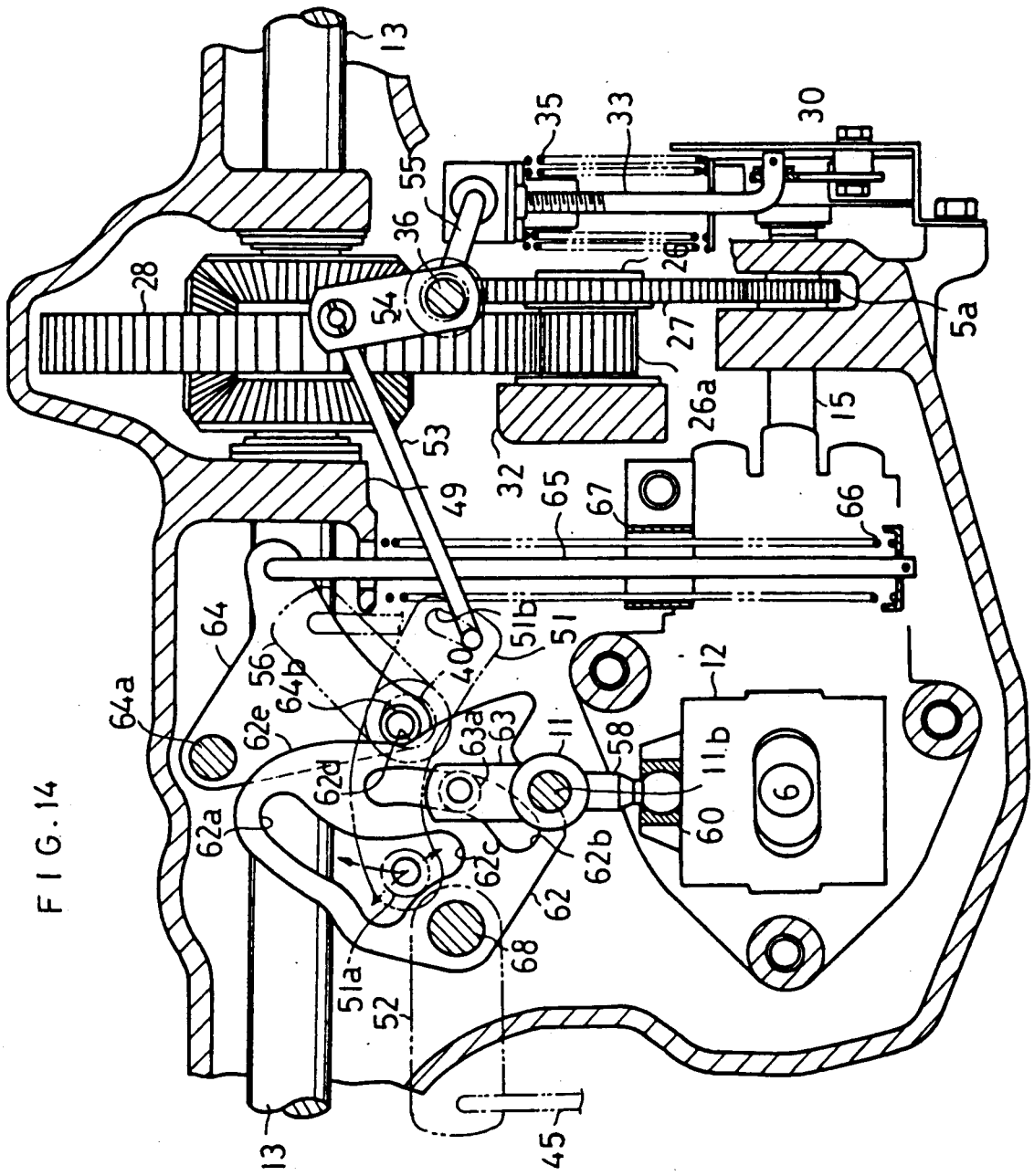
FIG. 14 is a plan view of a third embodiment of the invention.

Next, explanation will be given on construction of the third embodiment in accordance with FIGS. 14 and 15.

In the third embodiment, as in the second embodiment, the association mechanism for the braking device and speed change apparatus is disposed within the transmission case 1, but an operation mechanism for the variable swash plate 12 is improved.

In other words, the second and third embodiments are similar in that a rotary groove 62a for the braking action and a rotary groove 62c for the speed changing are open at a speed change cam plate 62 in condition of communicating with each other, a regulator 51a at a regulation arm 51 is fitted into the communicating grooves so that, when the brake pedal 25 is trod and the regulator 51a enters into the rotary groove 62a, the variable swash plate 12 is returned to the neutral position through the speed change cam plate 62. However, a swash plate operating cam groove 62b is bored in addition to the speed change cam plate 62.

The speed change cam plate 62 is connected through a rotary shaft 68 with the arm 52 linked with the speed change operating unit 4 and a swash plate operating member 63a for an arm 63 fixed to the swash plate angle control shaft 11 is inserted into the swash plate operating groove 62b. In this case, the third embodiment is different from the first second embodiments in that the rotation of speed change cam plate 62 is not transmitted directly to the swash plate angle control shaft 11.

The swash plate operating cam groove 62b is so formed that the variable swash plate 12, when the speed change operation unit 4 is operated in vicinity of the neutral, is rotated merely slowly, and largely at the position apart from neutral.

The swash plate angle control shaft 11, as shown in FIG. 15, is supported rotatably to a pivot portion 11b at a neutral adjusting shaft 11a and the neutral adjusting shaft 11a and pivot portion 11b are formed to be somewhat eccentric so that the neutral adjusting shaft 11a is properly rotated and fixed, and the swash plate angle control shaft 11 shifts in position, thereby enabling the neutral position of the variable swash plate 12 to be set with accuracy.

Also, in the second embodiment, in order to hold the speed change cam plate 62 in the neutral position, the neutral holding ball 59 projects outwardly from the transmission case 1 so as to be biased and fitted into the neutral position ball insertion groove, but in the third embodiment, the neutral holding mechanism is constituted within the transmission case 1.

Figure 16:
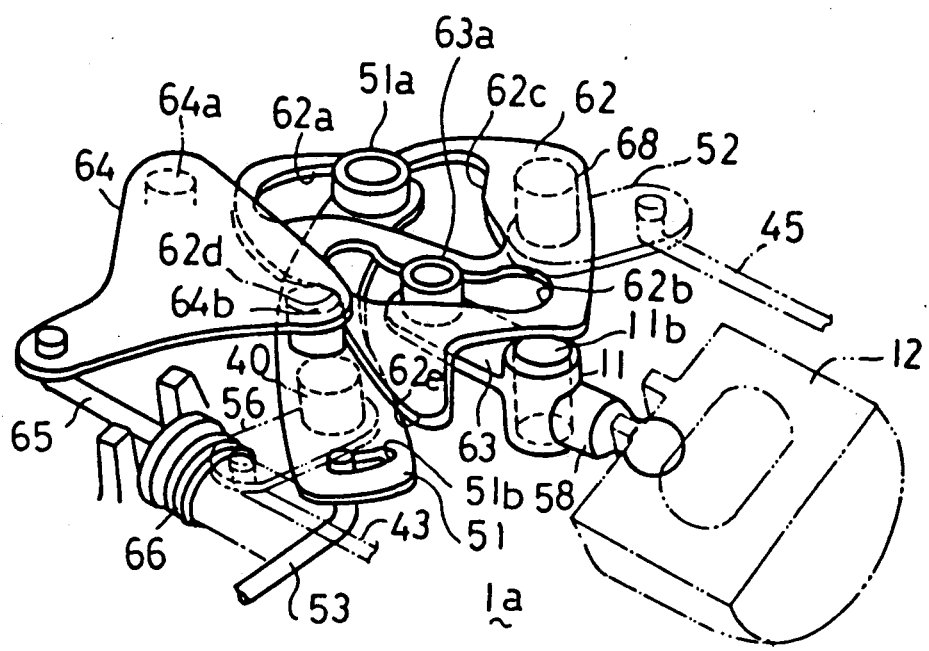

In other words, a neutral holding arm 64 is integrally pivoted by a pivot shaft 64a and a neutral position biasing member 64b provided at the neutral holding arm 64 is adapted to be permanently biased to abut against the neutral position holding recess 62d at the speed change cam plate 62 by permanently biasing springs 66 and 65 (FIG. 16). Reference numeral 67 designates a support for blocking movement of each permanently biasing spring 66 or 65.

A permanently biasing spring 66 is attached to one end of a biasing rod 65 through a spring holder and the other end of the same is attached to a wall of the upper half case 1a through a spring holder. Accordingly, when the speed change cam plate 62 rotates to the speed change position, the neutral position biasing member 64b rides on an inclined surface 62e, the neutral holding arm 64 rotates together with the pivot shaft 64a to pull the biasing rod 65, thereby compressing the permanently biasing spring 66. Hence, the permanently biasing spring 66 gives the inverted biasing rotation force to the neutral holding arm 64 so that the speed change cam plate 62 is subjected to a force for fitting the neutral position biasing member 64b into the neutral position holding recess 62d.

As shown in FIG. 15, an arm 69 is provided at part of pivot shaft 64a projecting from the transmission case 1 so that, when the pivot shaft 64a is rotated as above-mentioned, a neutral position detecting switch 70 is adapted to be off.

The third embodiment is different from the first embodiment in the rotation mechanism for the neutral holding mechanism or the variable swash plate 12, but similar to the same in operation of returning the variable swash plate 12 to the neutral position by operating the brake pedal 25.

Next, the effect of the present invention will be described with reference to construction to be claimed as follows:

The variable swash plate 12 at the variable displacement hydraulic pump P is first returned to the neutral position while the allowance gap provided between the link and the arm is being operated during the operation of brake operating unit, and thereafter the braking device exerts the braking action, whereby the hydraulic pump P and hydraulic motor M are not subjected to an overload and also the engine E is not subjected thereto, resulting in that the engine does not stop occurs.

Also, the regulator 42a rotates and shifts while holding the speed change cam plate 44 in the neutral position and the brake arm 37 and link are operated to actuate the braking device and the speed change cam plate 44 is kept stable in the neutral position by the regulator 42a for the braking action, thereby enabling the hydraulic pump P or hydraulic motor M to be prevented from a breakdown.

The speed change cam plate 44 is formed in a flat plate and the rotary groove 44d for the speed changing and the rotary groove 44c for the braking action are constituted so that the association mechanism can be smaller in thickness when viewed from the lateral side, thereby enabling the apparatus to be compact.

When the regulator 42a returns the speed change cam plate 44 to the neutral position, the neutral mechanism biases the speed change cam plate 44 toward the neutral position, thereby enabling the return time to be quicker. Also, since the speed change cam plate 44 can reliably be fixed in the neutral position, even when the brake operating unit is abruptly operated in the emergency braking action, the swash plate 12 can reliably be held in the neutral position.

An excessive braking force is cut by the shock absorber 35 interposed between the regulation arm and the break lever, thereby protecting of the braking device.

Since the association mechanism for the braking device and variable swash plate is disposed in the transmission case 1, part of the association mechanism can be lubricated by lubricating oil within the transmission case and be prevented from rusting or mudding, thereby enabling a stable operation.

Since the association mechanism for the braking device and variable swash plate is disposed in a dead space at the HST type speed change apparatus, the transmission case 1 can be compact.

The association mechanism for the braking device and swash plate is supported at the upper half casing 1a, thereby being simple to assemble.

The association mechanism is disposed in a space at the HST type speed change apparatus and the connection rod 53, which transmits the operating force to the braking device disposed at the reverse side to the association mechanism beyond the power transmission mechanism, can be pushed or pulled smoothly without any hindrance.

Although several embodiments have been described, they are merely exemplary of the invention and not to be constructed as limiting, the invention being defined solely by the appended claims.

What is claimed is:

1. Apparatus for selectively braking rotation of a driving axle driven by a hydraulic transmission, comprising:
   a speed change operation unit for shifting operation of the hydraulic transmission between an operative position wherein the hydraulic transmission transmits a driving power to the axle, and a neutral position wherein no power is transmitted by said hydraulic transmission to said axle;
   a speed change cam plate pivotably connected to said speed change operation unit, said speed change cam plate forming an allowance gap, said allowance gap including a first rotary groove and a second rotary groove;
   a brake operation link pivotably connected at one end of a regulation arm;
   a cam follower disposed at another end of said regulation arm, said cam follower received within said allowance gap of said speed change cam plate;
   wherein, when said hydraulic transmission is in the operative position, said cam follower is received within said first rotary groove of said allowance gap; and
   wherein, when force is applied to said brake operation link, said hydraulic transmission is shifted to the neutral position and said cam follower is received within said second rotary groove of said allowance gap before braking of the rotation of said driving axle is commenced.

2. Apparatus for selectively braking rotation of a driving axle driven by a hydraulic transmission as set forth in claim 1, further comprising:
   a brake lever for actuating a braking device for braking rotation of said axle;
   a shock absorber disposed between said regulation arm and said brake lever.

3. An axle driving apparatus, comprising:
   a transmission casing for supporting an axle;
   a hydraulic pump disposed within said transmission casing including a swash plate;
   a swash plate angle control shaft operatively connected to said swash plate for altering the rotation of said hydraulic pump between an operative position and a neutral position;
   a hydraulic motor disposed within said transmission casing and driven by said hydraulic pump to constitute a power transmission;
   a speed change cam plate fixed to said swash plate angle control shaft disposed within said transmission casing, said speed change cam plate including a rotary groove;
   a speed change link for rotating said speed change cam plate;
   a braking device for selectively braking rotation of said axle, said braking device including a regulation arm disposed within said transmission casing and rotatably by a brake link connected to a brake pedal; and
   a regulator disposed at one end of said regulation arm and received within said rotary groove of said speed change cam plate.

4. An axle driving apparatus as set forth in claim 3, wherein said transmission casing is divided horizontally with respect to said axle into an upper portion and a lower portion, and wherein said upper and lower portions pivotally support said axle within a bearing, said association mechanism being disposed along said upper portion.

5. An axle driving apparatus as set forth in claim 4, wherein said connecting rod extends from said association mechanism to said braking device and is disposed between said axle bearing and said power transmission.

6. An axle driving apparatus as set forth in claim 3, further comprising:

an association mechanism disposed outside said transmission casing for operating said braking device;

a connecting rod disposed within said transmission casing connected to said association mechanism; and an allowance gap formed in said regulation arm, wherein an end of said connecting rod is received within said allowance gap.

* * * * *

UNITED STATES PATENT AND TRADEMARK OFFICE
CERTIFICATE OF CORRECTION

PATENT NO. : 5,040,649
DATED : August 20, 1991
INVENTOR(S) : Hideaki Okada It is certified that error appears in the above-identified patent and that said Letters Patent is hereby corrected as shown below:

On the title page: Item [21] "608,790, should be --360,879--.

Column 4, line 51, after "regulator" insert --or cam follower--; and

Column 8, line 19, delete "the".

Also, the serial number is incorrect. It should be --360,879--.

Signed and Sealed this

Twenty-sixth Day of January, 1993

Attest:

STEPHEN G. KUNIN

*Attesting Officer*   *Acting Commissioner of Patents and Trademarks*